United States Patent
Melheim

(10) Patent No.: US 6,739,370 B2
(45) Date of Patent: May 25, 2004

(54) FLOATING HEATED PACKAGING SHOE

(75) Inventor: Scott B. Melheim, St. James, MN (US)

(73) Assignee: V-Tek Incorporated, Mankato, MN (US)

(*) Notice: Subject to any disclaimer, the term of this patent is extended or adjusted under 35 U.S.C. 154(b) by 0 days.

(21) Appl. No.: 10/348,160

(22) Filed: Jan. 21, 2003

(65) Prior Publication Data

US 2003/0131946 A1 Jul. 17, 2003

Related U.S. Application Data

(63) Continuation-in-part of application No. 09/846,753, filed on May 1, 2001, now Pat. No. 6,571,850.

(51) Int. Cl.$^7$ .............................................. B30B 15/00
(52) U.S. Cl. ................ 156/581; 156/583.1; 100/258 A; 53/374.8
(58) Field of Search ................................. 156/580, 581, 156/583.1; 100/258 R, 258 A; 53/374.8, 375.6

(56) References Cited

U.S. PATENT DOCUMENTS

| | | | |
|---|---|---|---|
| 2,589,756 A | 3/1952 | Waters | |
| 3,763,690 A | * 10/1973 | Kirincic et al. | ........... 72/447 |
| 3,937,645 A | 2/1976 | Ascoli et al. | |
| 3,946,190 A | 3/1976 | Hascoe | |
| 3,958,391 A | 5/1976 | Kujubu | |
| 3,961,743 A | 6/1976 | Hollowell | |
| 3,965,653 A | 6/1976 | Lerner | |
| 3,969,874 A | 7/1976 | Halcomb et al. | |
| 3,980,516 A | 9/1976 | Guard | |
| 3,998,135 A | 12/1976 | Sargent | |
| 4,001,066 A | 1/1977 | Channing et al. | |
| 4,011,798 A | 3/1977 | Bambara et al. | |
| 4,014,154 A | 3/1977 | Lerner | |
| 4,017,946 A | 4/1977 | Soja | |
| 4,019,946 A | 4/1977 | Greisman | |
| 4,019,949 A | 4/1977 | Greisman | |
| 4,025,383 A | 5/1977 | Ferrigno | |
| 4,063,401 A | 12/1977 | Higgins | |
| 4,064,776 A | 12/1977 | Walitalo et al. | |
| 4,065,344 A | 12/1977 | Weist | |
| T966,002 I4 | 1/1978 | Barnes et al. | |
| 4,066,108 A | 1/1978 | Lau | |
| 4,070,853 A | 1/1978 | Sanders | |
| 4,071,999 A | 2/1978 | Nolet | |
| 4,104,108 A | 8/1978 | Kishida et al. | |
| 4,109,441 A | 8/1978 | Shaw | |
| 4,160,689 A | 7/1979 | Altermatt | |
| 4,202,721 A | 5/1980 | Roberts | |
| 4,204,100 A | 5/1980 | Reichert | |
| 4,221,101 A | 9/1980 | Woods | |
| 4,221,626 A | 9/1980 | Clay | |
| 4,244,159 A | 1/1981 | Gess | |
| 4,260,447 A | 4/1981 | Muscariello | |
| 4,261,582 A | 4/1981 | Womack | |
| 4,282,699 A | 8/1981 | Embro, Jr. | |
| 4,288,270 A | 9/1981 | Mossell et al. | |

(List continued on next page.)

*Primary Examiner*—James Sells
(74) *Attorney, Agent, or Firm*—Oppenheimer, Wolff & Donnelly LLP; Daniel J. McKinley

(57) ABSTRACT

An anvil assembly having a housing and two rotatable inserts with flat upper surfaces against which the heated shoes of a package sealing machine may press a covering sheet onto a plastic package tape. The inserts have a limited range of rotation so that they automatically align themselves to be parallel to the heated shoes when they are contacted thereby. This rotatable insert feature obviates the need for precise, laborious alignment efforts. Alternatively, a pair of rotatable blades are pivotally attached to the shoes and act against a fixed anvil surface, thereby automatically aligning themselves to be parallel to the anvil surface.

29 Claims, 3 Drawing Sheets

U.S. PATENT DOCUMENTS

| | | |
|---|---|---|
| 4,288,968 A | 9/1981 | Seko et al. |
| 4,294,492 A | 10/1981 | Evans |
| 4,300,892 A | 11/1981 | Barnes et al. |
| 4,306,400 A | 12/1981 | Coleman et al. |
| 4,311,476 A | 1/1982 | Williams |
| 4,331,434 A | 5/1982 | Buschor |
| 4,333,790 A | 6/1982 | Schaffron |
| 4,346,545 A | 8/1982 | Crescenzo et al. |
| 4,349,344 A | 9/1982 | Evers |
| 4,351,692 A | 9/1982 | Ouellette |
| 4,378,266 A | 3/1983 | Gerken |
| 4,441,953 A | 4/1984 | Hollinger, Jr. |
| 4,488,924 A | 12/1984 | Krieg |
| 4,498,939 A | 2/1985 | Johnson |
| 4,504,350 A | 3/1985 | Joo |
| 4,504,352 A | 3/1985 | Meyer |
| 4,524,563 A | 6/1985 | Sassi |
| 4,534,154 A | 8/1985 | Gaubert |
| 4,545,177 A | 10/1985 | Day |
| 4,545,844 A | 10/1985 | Buchanan |
| 4,549,387 A | 10/1985 | Marshall et al. |
| 4,555,296 A | 11/1985 | Burtch et al. |
| 4,567,713 A | 2/1986 | Natterer |
| 4,613,320 A | 9/1986 | Lerner |
| 4,613,988 A | 9/1986 | Maddock |
| 4,637,199 A | 1/1987 | Steck et al. |
| 4,656,818 A | 4/1987 | Shimoyama et al. |
| 4,674,266 A | 6/1987 | Araki |
| 4,688,370 A | 8/1987 | Dighton et al. |
| 4,689,937 A | 9/1987 | Finan, Sr. et al. |
| 4,699,608 A | 10/1987 | Pistner |
| 4,704,100 A | 11/1987 | Kaufman |
| 4,720,872 A | 1/1988 | Kaczerwaski |
| 4,721,502 A | 1/1988 | Herrington |
| 4,733,517 A | 3/1988 | Araki |
| 4,768,411 A | 9/1988 | Su |
| 4,776,150 A | 10/1988 | Siegel |
| 4,820,249 A | 4/1989 | Wech |
| 4,832,773 A | 5/1989 | Shaposka et al. |
| 4,832,776 A | 5/1989 | Pace |
| 4,840,610 A | 6/1989 | Pistner |
| 4,849,040 A | 7/1989 | Wood |
| 4,874,257 A | 10/1989 | Inagaki |
| 4,894,040 A | 1/1990 | Bach et al. |
| 4,894,975 A | 1/1990 | Ausnit |
| 4,919,272 A | 4/1990 | Kai et al. |
| 4,941,310 A | 7/1990 | Kristen |
| 4,960,478 A | 10/1990 | Newkirk et al. |
| 4,965,985 A | 10/1990 | Masubuchi et al. |
| RE33,467 E | 12/1990 | Steck et al. |
| 4,989,391 A | 2/1991 | Wetter |
| 4,999,504 A | 3/1991 | Braunlich et al. |
| 5,021,209 A | 6/1991 | Dickinson |
| 5,022,767 A | 6/1991 | Cardulla |
| 5,029,432 A | 7/1991 | Loeliger |
| 5,030,190 A | 7/1991 | Woods et al. |
| 5,038,547 A | 8/1991 | Kai et al. |
| 5,080,747 A | 1/1992 | Veix |
| 5,087,235 A | 2/1992 | Lafleur |
| 5,110,041 A | 5/1992 | Keeler |
| 5,118,202 A | 6/1992 | Bruno |
| 5,134,001 A | 7/1992 | Osgood |
| 5,141,795 A | 8/1992 | Kai et al. |
| 5,152,613 A | 10/1992 | Herrington, Jr. |
| 5,155,969 A | 10/1992 | Kuethe |
| 5,167,750 A | 12/1992 | Myers |
| 5,188,623 A | 2/1993 | Kok |
| 5,230,430 A | 7/1993 | Kidder |
| 5,252,171 A | 10/1993 | Anderson et al. |
| 5,286,110 A | 2/1994 | Benson et al. |
| 5,304,265 A | 4/1994 | Keeler |
| 5,322,719 A | 6/1994 | Westling et al. |
| 5,350,000 A | 9/1994 | Wang |
| 5,375,930 A | 12/1994 | Tani |
| 5,410,857 A | 5/1995 | Utley |
| 5,417,041 A | 5/1995 | Hansen et al. |
| 5,456,055 A | 10/1995 | Boulanger et al. |
| 5,465,842 A | 11/1995 | Utley |
| 5,472,282 A | 12/1995 | Kristola |
| 5,483,784 A | 1/1996 | Owensby et al. |
| 5,489,252 A | 2/1996 | May |
| 5,509,735 A | 4/1996 | May |
| 5,518,316 A | 5/1996 | Kristola |
| 5,520,464 A | 5/1996 | Kristola |
| 5,524,633 A | 6/1996 | Heaven et al. |
| 5,533,323 A | 7/1996 | Osti et al. |
| 5,540,802 A | 7/1996 | Totani |
| 5,564,263 A | 10/1996 | Boulanger et al. |
| 5,564,478 A | 10/1996 | Weinheimer et al. |
| 5,564,829 A | 10/1996 | Lafond |
| 5,567,980 A | 10/1996 | Holonyak, Jr. et al. |
| 5,576,037 A | 11/1996 | Moore, Jr. et al. |
| 5,593,397 A | 1/1997 | La Gro |
| 5,599,421 A | 2/1997 | Frost et al. |
| 5,604,000 A | 2/1997 | May |
| 5,613,344 A | 3/1997 | Osti et al. |
| 5,613,601 A | 3/1997 | Boulanger et al. |
| 5,618,252 A | 4/1997 | Melville |
| 5,636,925 A | 6/1997 | Smiley |
| 5,662,575 A | 9/1997 | Saito et al. |
| 5,682,727 A | 11/1997 | Harte et al. |
| 5,702,339 A | 12/1997 | Smiley |
| 5,733,636 A | 3/1998 | May |
| 5,761,878 A | 6/1998 | Walkiewicz, Jr. et al. |
| 5,771,667 A | 6/1998 | McGregor et al. |
| 5,786,010 A | 7/1998 | Yannuzzi, Jr. |
| 5,791,125 A | 8/1998 | Kallner |
| 5,814,382 A | 9/1998 | Yannuzzi, Jr. |
| 5,816,990 A | 10/1998 | Melville |
| 5,843,496 A * | 12/1998 | Ito et al. ..................... 425/589 |
| 5,858,164 A | 1/1999 | Panjwani et al. |
| 5,863,378 A | 1/1999 | Panjwani et al. |
| 5,865,942 A | 2/1999 | Sinclair |
| 5,868,901 A | 2/1999 | Smith |
| 5,893,256 A | 4/1999 | Ghirlandi |
| 5,918,441 A | 7/1999 | Baker |
| 5,952,025 A | 9/1999 | Yannuzzi, Jr. |
| 6,021,629 A | 2/2000 | Sterner, Sr. |
| 6,038,839 A | 3/2000 | Linkiewicz |
| 6,058,681 A | 5/2000 | Recchia, Jr. |
| 6,058,735 A | 5/2000 | Nathan |
| 6,065,271 A | 5/2000 | Nicastro |
| 6,230,781 B1 | 5/2001 | Smith |
| 6,571,850 B2 * | 6/2003 | Melheim ..................... 156/581 |

* cited by examiner

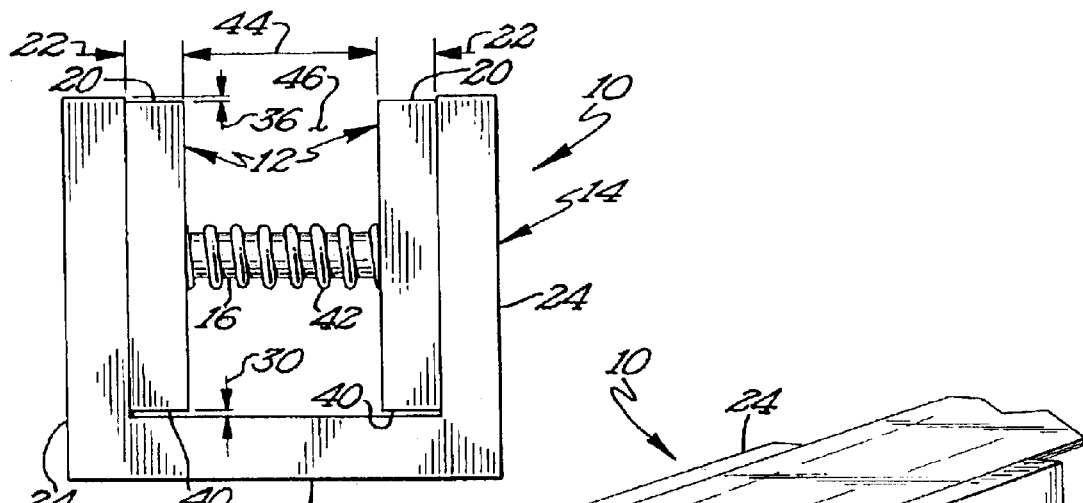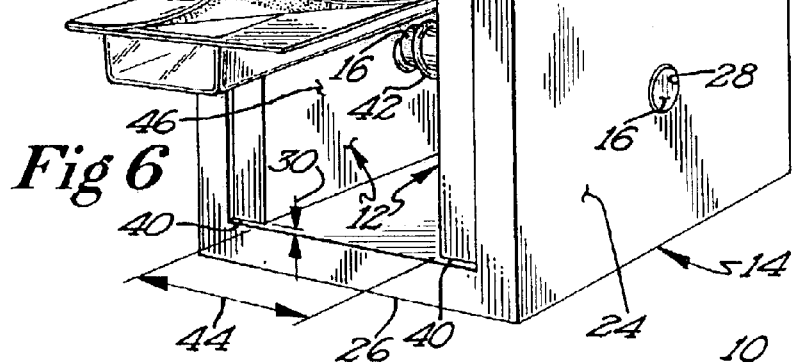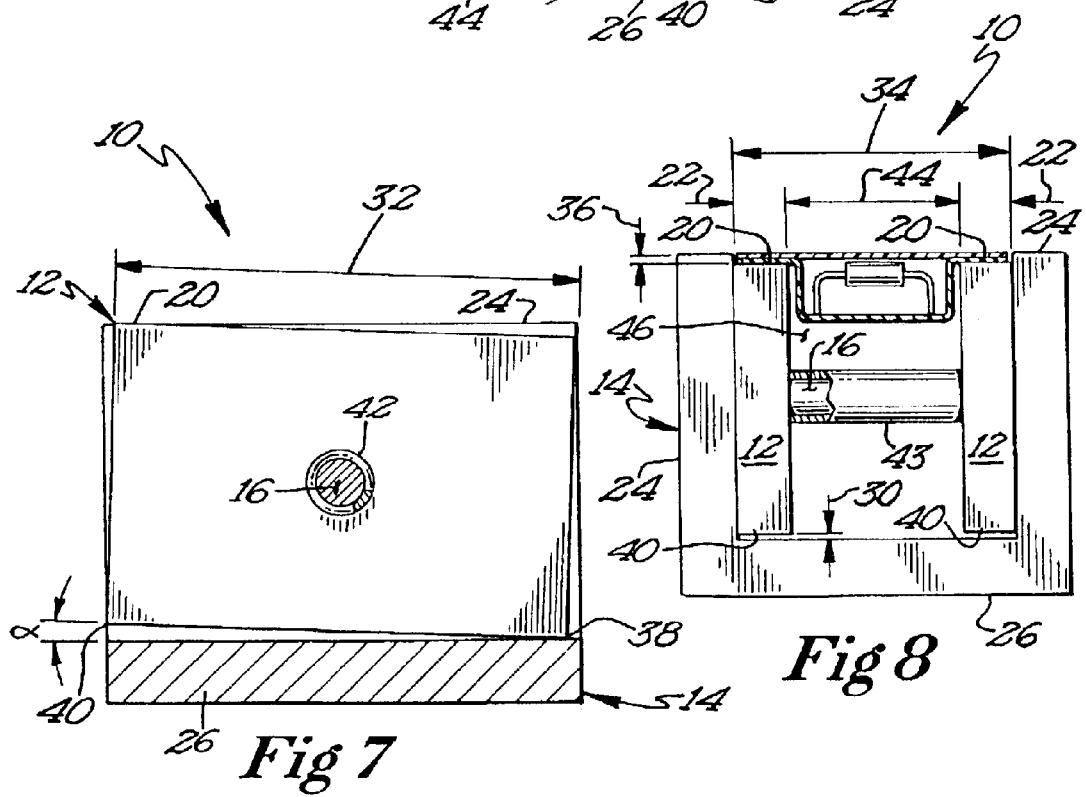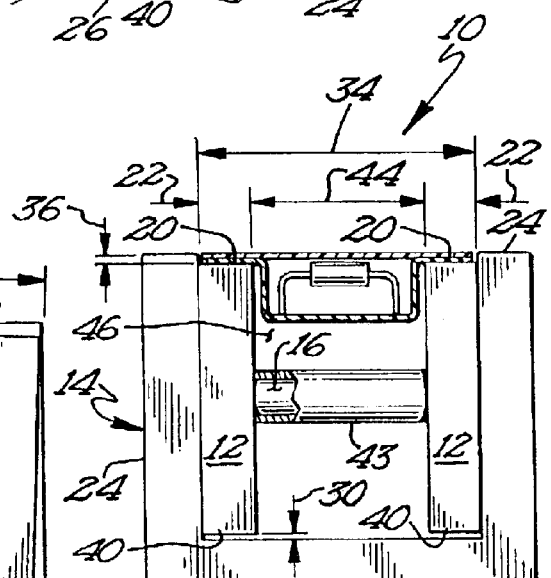

FLOATING HEATED PACKAGING SHOE

RELATED APPLICATION

The following application is a continuation in part of U.S. patent application Ser. No. 09/846,753 filed May 1, 2001 now U.S. Pat. No. 6,571,850.

BACKGROUND OF THE INVENTION

The field of the present invention pertains generally to packaging for electronic components. More specifically, the present invention pertains to a device used to seal plastic containers for electronic components which includes an anvil and a heated shoe assembly.

Automating the process of making electronic circuitry necessarily includes presenting electronic components to a robot in a consistent, predictable orientation so that the robot may grasp the component and place it onto a circuit board. Requiring a robot to select and orient the components from a bin, for example, would be impractical, if not impossible. Even if the components are placed on the circuit board manually, presenting the components in a consistent, orderly fashion increases the productivity of the worker.

Proper packaging methods can ensure that the components are presented to an operator, assembler, or a robot in a predictable, repeatable manner. One such packaging method results in a string or "tape" of plastic pockets, each containing a component. This method includes a forming a strip of plastic into an elongate tape of pockets which are roughly centered between the longitudinal edges of the tape. The pockets do not extend all the way to the edges of the tape such that two horizontal flanges exist on either side of the pockets. The flanges run the length of the tape and provide a surface to which a cover sheet may be attached to secure the components within the pockets. An example of this type of packaging is shown in FIG. 1.

One manufacturing problem that this packaging presents pertains to the accuracy required by the machinery used to secure the covering sheet to the flanges. Whether the covering sheet is secured to the flanges with an adhesive or by heat sealing, a rigid surface below the flange and above the sheet are used to press the sheet and the flange against each other. The assembly above the flange is referred to as a shoe and the surface below is referred to as an anvil. Because the flange and the cover are extremely thin, there is little room for error in the alignment of the opposing rigid surfaces. If, for example, the surfaces are not completely parallel, one side of the rigid surface will be closer to its opposing counterpart than the other side. As the two rigid surfaces approach each other in a sealing operation, the closer side will make contact first, thereby pressing the cover and the flange together, but will prevent the other side from ever making contact and, thus, from forming a proper seal. The result will be a length of the tape wherein one side of the cover is secured and the other is not. If allowed to repeat, there will be produced a component tape having areas in which the cover is secured alternating with areas in which the cover is not secure.

There is a need for a anvil having flat surfaces which automatically assume an orientation which is parallel to the flat surface against which they are being pressed.

There is further a need for an improved anvil that obviates the need for periodic realignment.

There is a need for an improved heated shoe having operative surfaces which automatically assume an orientation which is parallel to the flat surface against which they are being pressed.

There is a further need for an improved heated shoe assembly that obviates the need for periodic realignment.

BRIEF SUMMARY OF THE INVENTION

A "floating" anvil assembly is provided having a pair of inserts with two flat contact surfaces against which a heated shoe may be pressed. The inserts have a predetermined range of rotation about an axis such that when the shoe is pressed against each of the inserts, the contact surfaces of the inserts assume a parallel relationship with the contact surfaces of the shoes.

More specifically, the anvil assembly of the present invention generally comprises a base to which a pin is operably connected. A first and second insert are rotatable around the pin over a predetermined angular range. The base is preferably shaped like a horseshoe, opening upwardly, with the inserts positioned on the insides of, and adjacent to, the base side walls.

The flat contact surfaces of the inserts are constructed and arranged to act against a separate surface of the package sealing machine during a sealing operation. The upper surfaces preferably end slightly below the walls of the base so that the upper inside sides of the base walls may act against the sides of the packaging tape to maintain the alignment of the tape as it is fed over the inserts. The predetermined range of rotation is provided by the shape of the lower edges of the inserts. The lower edges of the inserts act against the bottom of the base during rotation, thereby defining the forward and rearward limits of rotation.

In operation, the anvil assembly is placed in a heat sealing machine and a packaging tape is fed over the inserts so that the flanges of the tape ride on the top surfaces of the inserts and the pockets of the tape extend between the inserts. A heated shoe having heated surfaces drops down and acts against the top surfaces of the inserts to press the cover sheet and the flanges of the tape together. The inserts may rotate slightly so that the top surfaces of the inserts are parallel to the heated surfaces of the shoe. The shoe remains pressed against the inserts for a predetermined period of time until enough heat is absorbed by the packaging to create a seal between the flange of the package and the covering sheet. The shoe is then lifted and the tape is advanced, guided by the walls of the base, and the process repeats.

The ability of the inserts to rotate slightly ensures that the pressure felt by the packaging will be substantially even across the extents of the upper surfaces of the inserts. If the inserts were fixed relative to the base, the inserts would have to be perfectly parallel to the surfaces of the packaging machine in order to accomplish placing even pressure across the extents of the inserts.

In an alternate embodiment, a floating shoe assembly is provided having a pair of independent shoes moveable along a single line or arc, each having a heated blade which presses against rigid contact surfaces of an opposing anvil. The blades have a predetermined range of rotation about an axis generally perpendicular to the line of movement of the shoe, such that when the blades are pressed against the contact surfaces of the anvil, the blades assume a parallel relationship with the contact surfaces of the anvil. The anvil and pair of shoe assemblies are configured to provide sealing to both sides of a tape in a manner similar to the embodiment described above.

More specifically, each shoe assembly of this embodiment generally comprises a pin operably connected to a shoe. The blade is rotatable around the pin over a predetermined angular range. The shoe is preferably shaped like a horseshoe, opening downwardly, with the blade substantially filling and extending from the opening of the horseshoe. The inner side walls of the horseshoe provide lateral support for the blade, along with the pin.

The pin and blade are constructed and arranged to provide a small space between the upper surface of the blade and the inner top surface of the shoe. This small space or gap provides the range of rotation for the blade. As it may be desired to place a heating element in the shoe as opposed to, or in conjunction with, the blade, for heating the blade, it is important that the gap be relatively small and that the width of the blade closely matches the width of the opening of the horseshoe. This arrangement maximizes surface to surface contact between the blade and the shoe, thereby increasing the heat transfer therebetween.

It is therefore an object of the present invention to provide an anvil assembly having contact surfaces which rotate to assume a parallel relationship with the heated surfaces of a shoe acting the anvil assembly.

It is further an object to provide an anvil assembly which obviates the need for realigning a packaging machine on a regular basis.

It is also an object to provide a shoe assembly having rotatable blades for acting against a fixed anvil.

These and further objects and advantages of the present invention will become clearer in light of the following detailed description of illustrative embodiments of this invention described in connection with the drawings.

BRIEF DESCRIPTION OF THE DRAWINGS

The illustrative embodiments may best be described by reference to the accompanying drawings where:

FIG. 5 is a front elevation of the preferred anvil assembly of the present invention;

FIG. 6 is a perspective view of the anvil assembly of the present invention receiving a packaging tape;

FIG. 7 is a cutaway side elevation of preferred anvil assembly of the present invention showing the range of motion of the inserts around the pin;

FIG. 8 is a front elevation of the preferred anvil assembly of the present invention carrying a packaging tape which is cutaway to show how the tape is received by the anvil assembly;

Figure 1:
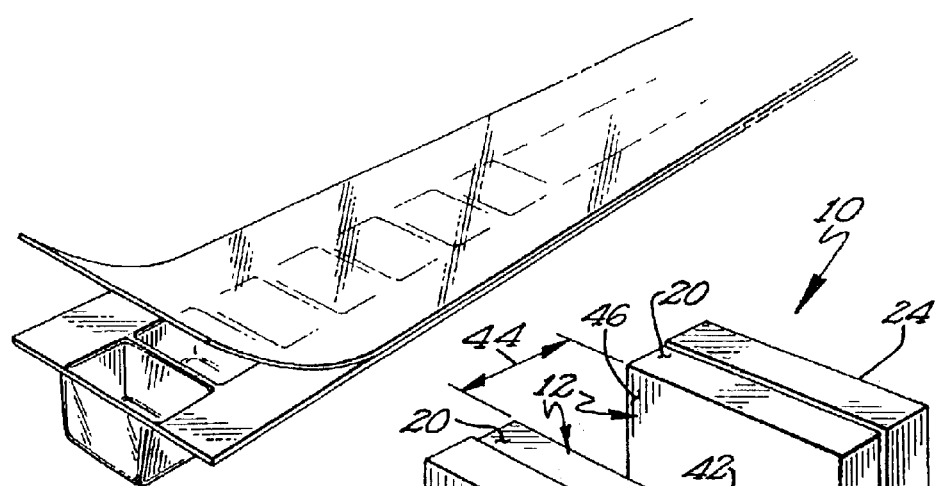
FIG. 1 is a perspective view of a component tape and covering sheet to which the present invention is directed.
Figure 2:
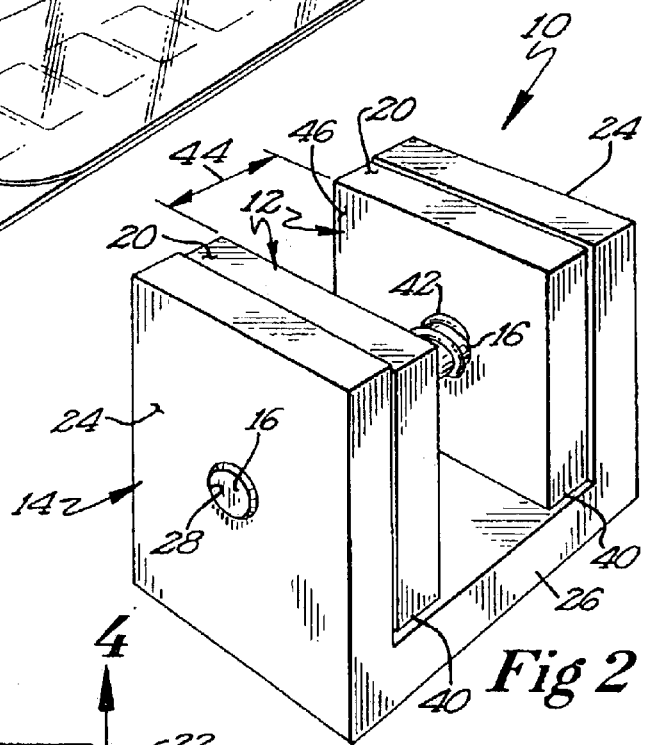
FIG. 2 is a perspective view of a preferred anvil assembly of the present invention.
Figure 3:
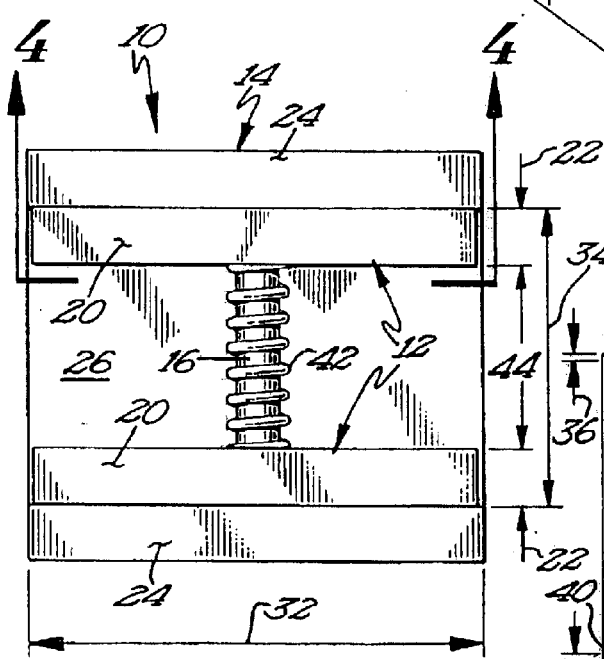
FIG. 3 is a plan view of a preferred anvil assembly of the present invention.
Figure 4:
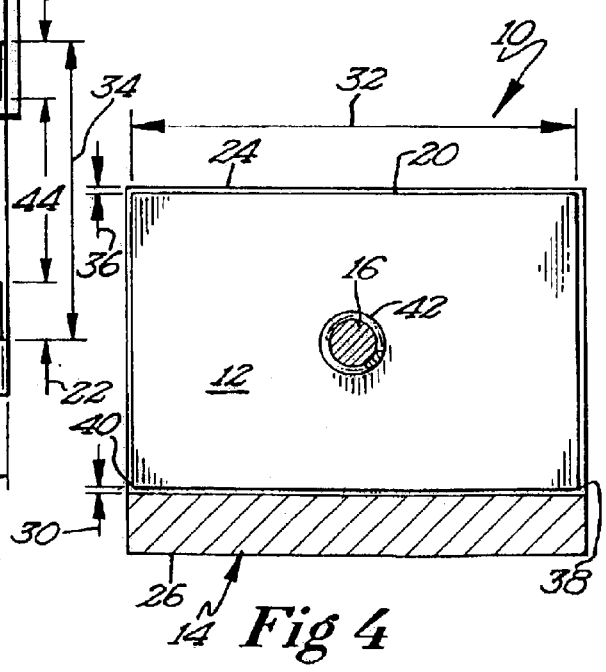
FIG. 4 is a cutaway side elevation of preferred anvil assembly of the present invention taken generally along lines 4—4 of FIG. 3.

All Figures are drawn for ease of explanation of the basic teachings of the preferred embodiments only. The extensions of the Figures with respect to number, position, relationship, and dimensions of the parts to form the preferred embodiments will be explained or will be within the skill of the art after the following description has been read and understood. Further, the exact dimensional proportions to conform to the specific force, weight, strength, and similar requirements will likewise be within the skill of the art after the following description has been read and understood.

DETAILED DESCRIPTION OF THE INVENTION

Referring now to the Figures, there is shown an anvil assembly 10 useable with a packaging machine for pressing a covering sheet onto a package. The anvil assembly 10 is attachable to the packaging machine and provides a pair of flat surfaces against which heated shoes may press a cover sheet and a packaging tape together. The anvil assembly 10 generally has inserts 12, a base 14, and a pin 16. The pin 16 is supported by the base 14 and the inserts 12 have a limited range of rotation around the pin 16.

The inserts 12 have top surfaces 20 which are straight, flat and have widths 22. Widths 22 define the maximum width of the seals that may be made between the covering sheet and the flanges of the packaging tape. It is envisioned that the inserts 12 of the anvil assembly 10 are removable and interchangeable with inserts 12 of various sizes such that a given anvil assembly 10 may be used in sealing operations involving packaging tapes of various sizes. Though the shape of the inserts is shown as being rectangular in the Figures, it is envisioned that a plurality of shapes could be used so long as the top surfaces 20 are straight and flat as shown in the Figures. Rectangular inserts 12, however, are simple and efficient to manufacture.

It is also envisioned that the two inserts 12 used during a given sealing operation may be of different widths 22 to match packaging tapes having flanges of different widths. For example, a packaging tape may have part of one flange perforated for use as a feed tape. Though the cover may not extend over this part, the insert 12 on the side of the flange defining the feed tape will be wide enough to support the wider flange.

The base 14 is sturdy and attachable to the heat sealing machine. Preferably, the base 14 has two walls 24 that extend upwardly from a floor 26. The walls 24 define two holes 28 through which the pin 16 may be inserted. The Figures show these holes 28 located relatively in the center of the walls 24. The pin 16 functions to support the inserts 12 and to define and axis of rotation around which the inserts 12 rotate. In order to provide balance to the inserts 12, it is important that the pins are located midway between the forward edge 40 and rearward edge 38 of the inserts 12. This ensures even pressure will be felt by the entire top surfaces 20 of the inserts 12. However, the vertical placement of the pin 16 may vary.

The walls 24 of the base 14 are separated by a distance 34 which is approximately equal to, or slightly greater than, the width of the packaging tape that will pass through a channel 46 defined by the walls 24 and the pin 16 during a sealing operation. The walls 24 act as a guide against the sides of the tape to maintain the tape in proper alignment with the anvil assembly 10 and the packaging machine. To this end, it is preferable that the inserts 12 do not extend to the top surface of the walls 24. Rather, the inserts 12 are constructed and arranged so that their top surfaces 20 are located below the tops of the walls 24 by a distance 36 which is equal to or slightly greater than the thickness of the tape flange and covering material.

Similarly, the bottom edges of the inserts 12 do not extend to the floor 26 of the base 13 when the bottom edges of the inserts 12 are parallel to the floor 26. As shown in FIG. 7, in order to provide the desired range of rotation α of the inserts 12, the inserts 12 are elevated above the floor 26 by a predetermined elevation 30. Elevation 30 is calculated, based on the length 32 of the inserts 12, to provide a range of rotation α which is less than 180°, preferably between +/−0.5° to +/−2.5°, more preferably on the order of +/−1.0°. The length 32 affects the forward and rearward rotation limits of the inserts 12 in that the rearward bottom edge 38 abuts against the floor 26 when the inserts 12 have reached their rearward rotation limits, and the forward edge 40 abuts against the floor 26 when the inserts 12 have reached their forward rotation limits. Therefore, the length 32 of the inserts 12, as well as the elevation 30 above the floor 26, determine the range of rotation α.

A relatively small range of rotation α, such as +/−1.0°, is adequate to accomplish the objects of the invention because the degree of error in the setup of an anvil assembly in a packaging machine does not exceed this range. Providing an excessively large range of rotation α could be disadvantageous as the excessive angular movement of the inserts 12 during a sealing operation may impart a horizontal force on the packaging tape, thereby causing it to "walk" in a forward or rearward direction.

It is envisioned that the base 14 be of any suitable shape which accomplishes the functions described herein. However, like the inserts 12, the relatively rectangular design of the base 14 which is shown in the Figures, is advantageous for purposes of accurate and efficient manufacturing, and ease of attachment to the packaging machine.

In order to form a proper seal between the covering film and the flanges of the packaging tape, it is important that the inserts 12 remain separated and close to or abutting the inside surfaces of the walls 24. This is best accomplished by providing a spring 42 which winds around the pin 16 and is biased to push the inserts 12 apart. Maintaining the inserts 12 in this spaced apart relationship also ensures that an appropriate gap 44 exists between the inserts 12 to allow room for the pockets of the packaging tape to pass. A preferred embodiment, shown in FIG. 8, provides a tubular spacer 43, surrounding pin 16, cut to a predetermined length in order to maintain proper spacing between the inserts 12 while allowing the inserts 12 to rotate freely through the range of rotation α, adjacent the walls 24. Alternatively, washers or similar rigid stops could be attached to, or formed on, the pin 16 in order to keep the inserts 12 from drifting along the pin 16 toward each other.

Referring now to FIGS. 9–14, there is shown an alternative embodiment of the present invention whereby a floating shoe assembly 100 is used to act against a rigid anvil 102. The shoe assembly 100 is considered "floating" because it includes a blade 104 which is rotatably attached to a shoe 106 via a pin 108.

The shoe 106 preferably includes a wall 110 and more preferably a pair of opposing walls 110 that define a hole 112 therethrough for receiving the pin 108. The walls 110 may be connected by a ceiling 114 such that the walls 110 and the ceiling 114 together form a downwardly opening "U" shape. Thus, the walls 110 form a groove 116 therebetween upwardly defined by the ceiling 114. The walls 110 are constructed and arranged such that the groove 116 is sized to receive the blade 104 and provide lateral support therefore.

The blade 104 fits within the groove 116, as stated, and includes a surface 118 for acting against the anvil 102 during a sealing operation. The surface 118 may be shaped to provide the desired seal width and to impart a predetermined pressure against the anvil 102. It is envisioned that a plurality of interchangeable blades 104 are provided with the assembly 100 for providing a variety of surfaces 118. One skilled in the art will see that a variety of options exist for heating the blade 104. A preferred option is a heating element 120, inserted into a receiving hole 122.

Figure 11:
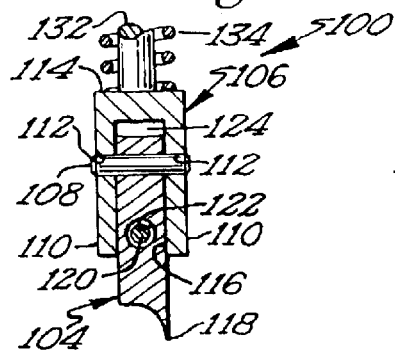
FIG. 11 is a front sectional view of a shoe having a rotatable blade.
Figure 12:
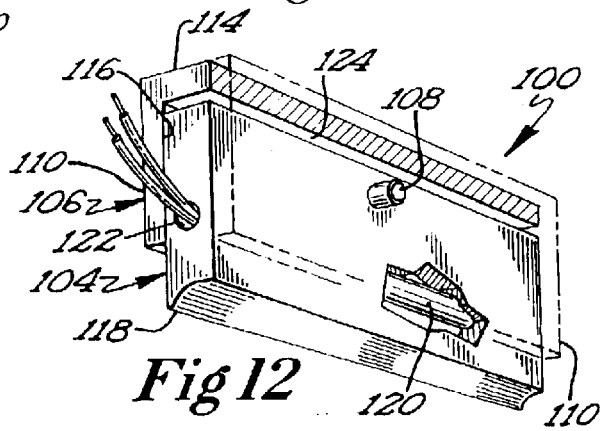
FIG. 12 is a perspective cutaway of a rotatable heated blade inserted in a shoe.
Figure 13:
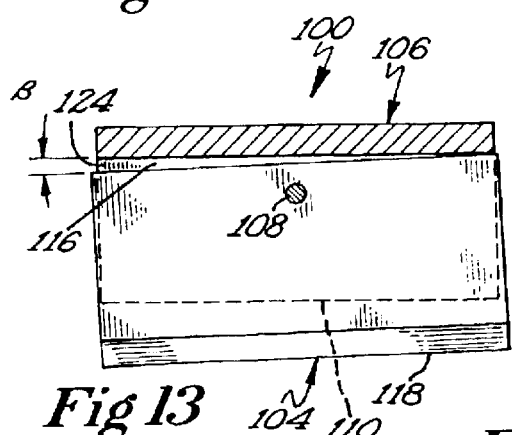
FIG. 13 is a side sectional view of a rotatable shoe rotated to its limit in a first direction; and, FIG. 14 is a side sectional view of the rotatable shoe of FIG. 13 rotated to its limit in a second direction.
Figure 14:
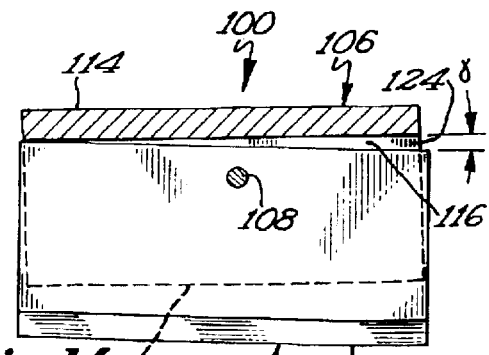

When the blade 104 is inserted into the groove 116 and the pin 108 is in place, there exists a small gap 124 between the ceiling 114 and the top of the blade 118. This gap 124, as best seen in FIG. 11, defines a range of rotation of the blade 104 around the pin 108. Using a parallel relationship between the top of the blade 104 and the ceiling 114 as a zero reference, a first direction range of rotation, β, is shown in FIG. 13 and is limited by the eventual contact between the blade 104 and the ceiling 114. Likewise, a second direction range of rotation, γ, is shown in FIG. 14 and is similarly limited by the eventual contact between the blade 104 and the ceiling 114.

The range of rotation in either direction may be relatively small to accomplish the objects of the invention. For instance, the first direction range of rotation, β, is preferably between 0.1° and 2.5°, more preferably on the order of 0.5° to 1.0°. Similarly, the second direction range of rotation, γ, is preferably between 0.1° and 2.5°, more preferably on the order of 0.5° to 1.0°.

Figures 9, 10:
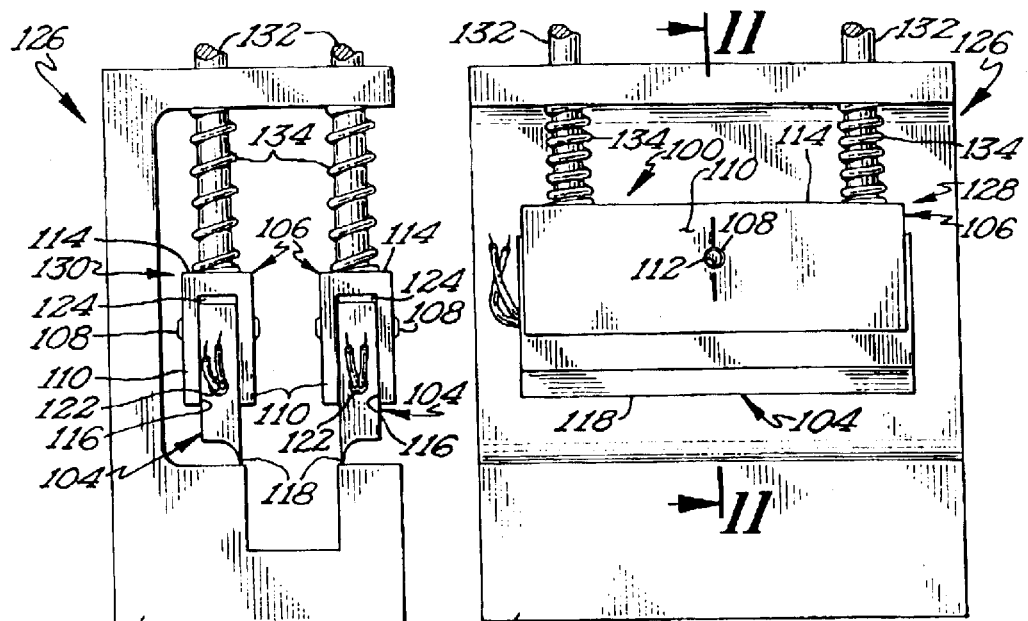
FIG. 9 is a front elevation of a sealing machine having rotatable blades.
FIG. 10 is a side elevation of a sealing machine having rotatable blades.

Turning now to FIGS. 9–10, there is shown a sealing machine 126 utilizing the floating shoe assembly 100 of the present invention. The machine includes two shoe assemblies 100 arranged to seal both sides of a package tape simultaneously. Though the present invention encompasses two assemblies 100 connected together such that both assemblies 100 move in concert, preferably, the assemblies 100 are constructed and arranged to move independently of each other. Independent movement ensures that variances in the thickness of the flanges of the package tape do not adversely affect the sealing of the opposite flange.

As shown in the Figures, the assemblies 100 are operably attached to the machine 126 so that they may be moved into and out of operable proximity to the anvil 102. Specifically, the assemblies 100 are moveable between a first position 128, (FIG. 10) in which the blade surface 118 is displaced from the anvil 102, to a second position 130, (FIG. 9) wherein the blade surface 118 is close enough to the anvil 102 to operably seal a package flange therebetween without cutting the package. Preferably, this relationship is accomplished by way of guide bars 132.

Guide bars 132 extend from a top surface of the machine 126 and a lower portion of the guide bars 132 pass through a respective hole in the shoe assembly 100 such that the shoe assembly 100 may slide along the guide bar 132 between the first position 128 and the second position 130. It is preferable to provide two guide bars 132 per shoe assembly 100. Parallel guide bars 132 provide a linear path for the shoe assembly 100 between the first position 128 and the second position 130. Springs 134 are provided that bias the shoe assemblies 100 upwardly toward the first position 128 to prevent unwanted contact between the blade surface 118 and the package flange when the package tape is being advanced.

Those skilled in the art will further appreciate that the present invention may be embodied in other specific forms without departing from the spirit or central attributes thereof. In that the foregoing description of the present invention discloses only exemplary embodiments thereof, it is to be understood that other variations are contemplated as being within the scope of the present invention. For example, the guide bars 132 could be omitted and an arcuate path could be formed between the first position 128 and the second position 130 by operable connecting the shoe assemblies 100 to swing arms pivotally connected to the sealing machine 126.

Accordingly, the present invention is not limited in the particular embodiments which have been described in detail therein. Rather, reference should be made to the appended claims as indicative of the scope and content of the present invention.

What is claimed is:

1. A shoe assembly, useable against fixed anvil surfaces of a packaging machine comprising:
    a shoe;
    a blade;
    a pin operably connecting said shoe to said blade; and
    said blade rotatable about said pin over a predetermined range of rotation and having a surface constructed and arranged to act against the anvil during a sealing operation.

2. The shoe assembly of claim 1, wherein said shoe comprises at least one wall defining a hole sized to receive said pin.

3. The shoe assembly of claim 1, wherein said shoe comprises a pair of opposed walls, each defining a hole receiving opposite ends of said pin.

4. The shoe assembly of claim 3, wherein said shoe further comprises a ceiling connecting said opposed walls.

5. The shoe assembly of claim 4, wherein said blade is positioned a predetermined distance from said ceiling such that when said blade is rotated, said blade abuts against said ceiling, said ceiling thereby limiting said range of rotation.

6. The shoe assembly of claim 1, wherein said predetermined range of rotation is between 2.5 degrees in a first direction and 2.5 degrees in a second direction opposite said first direction.

7. The shoe assembly of claim 1, wherein said predetermined range of rotation is between 1.0 degree in a first direction and 1.0 degree in a second direction opposite said first direction.

8. The shoe assembly of claim 3, wherein said pair of opposed walls are spaced apart such that said opposed walls and said ceiling define a groove.

9. The shoe assembly of claim 8, wherein said blade substantially fills said groove except for a gap between said blade and said ceiling, said gap defining the limits of said predetermined range of rotation.

10. The shoe assembly of claim 1 wherein said blade surface is heated.

11. The shoe assembly of claim 1 wherein said blade surface is of a predetermined size and shape selected to impart a predetermined pressure on a flange of a package during a sealing operation.

12. The shoe assembly of claim 1 wherein said blade is removably connected to said shoe.

13. The shoe assembly of claim 1 further including a heating element operably connected to said blade.

14. The shoe assembly of claim 13 wherein said heating element is disposed within a receiving hole defined by said blade.

15. A shoe assembly, useable in a package sealing machine, comprising:
    a blade having a body of a predetermined width and a contact surface extending from said body; and
    a shoe constructed and arranged to rotatably carry said blade, said shoe being movable between a first position and a second position such that said contact surface is presented toward a rigid anvil of the package sealing machine, during a sealing operation, when said shoe moves from said first position to said second position.

16. The shoe assembly of claim 15, wherein said shoe comprises a pin rotatably holding said blade relative to said shoe.

17. The shoe assembly of claim 16, wherein said shoe further comprises a wall defining a hole size to receive said pin.

18. The shoe assembly of claim 16, wherein said shoe further comprises a pair of opposed walls, each defining a hole sized to receive an end of said pin.

19. The shoe assembly of claim 16 further comprising a heater operably connected to said blade.

20. A self-leveling package sealing machine comprising:
    a shoe having a rotatable blade, said shoe moveable along a path between a first position and a second position;
    an anvil having a surface against which said blade acts when said shoe is in said second position.

21. The machine of claim 20 wherein said path is linear.

22. The machine of claim 21 wherein said path is defined by a guide bar, a portion of said guide bar passing through a hole in said shoe such that said shoe is slideably disposed on said guide bar.

23. The machine of claim 22 further comprising a second guide bar, a portion of said second guide bar passing through a second hole in said shoe such that said shoe is slideably disposed on both of said guide bars.

24. The machine of claim 20 wherein said second position is defined by said anvil surface.

25. The machine of claim 20 further comprising a pin connecting said blade to said shoe, said blade rotatable around said pin.

26. The machine of claim 21 wherein said blade is rotatable around an axis of rotation which is perpendicular to said path.

27. The machine of claim 20 wherein said path is arcuate.

28. A self-leveling package sealing machine usable to seal a flanged belt of individual component containers comprising:
    a pair of shoes, each having a rotatable blade, said shoes moveable along linear paths between a first position and a second position;
    a heating element operably connected to each of the shoes for heating the blade to a temperature suitable for sealing a cover to the flange of the belt; and,
    an anvil having a surface against which said blade acts when said shoe is in said second position, said surfaces constructed and arranged to form a gap therebetween sized to allow the containers to pass through the gap;
    whereby when said shoes are in said first position, said blade is displaced from said anvil surface; and,
    whereby when said shoes are in said second position, said blade acts against surface and rotates around a pin connecting said blade to said shoe, such that said blade forms a parallel relationship with said surface.

29. The machine of claim 28 wherein each of said shoes is moveable independent of the other of said shoes.

* * * * *